3,035,147
AUTOMATICALLY OPERABLE ELECTRODE
HOLDER AND CARRIER
Eugene H. Latter, 2019 Lincoln Way,
San Francisco, Calif.
Filed May 25, 1959, Ser. No. 815,664
7 Claims. (Cl. 219—60)

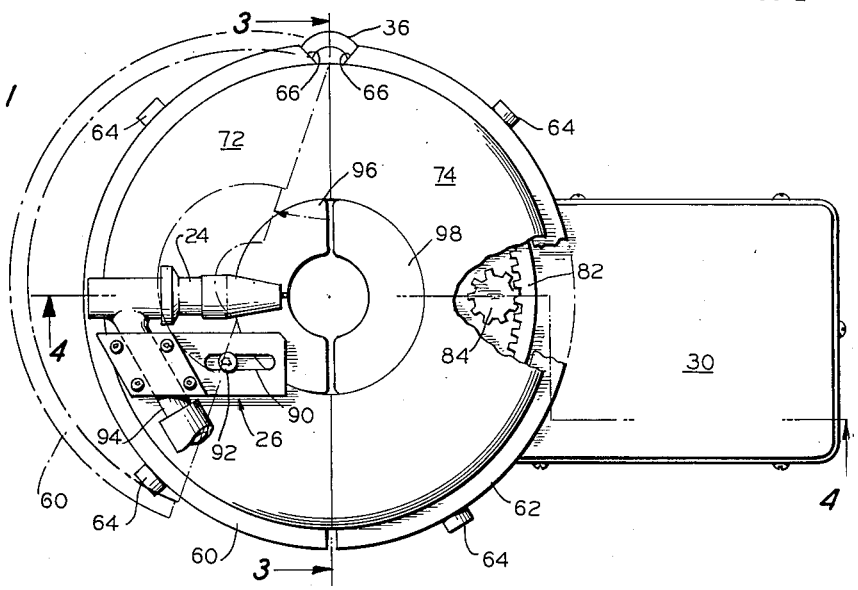
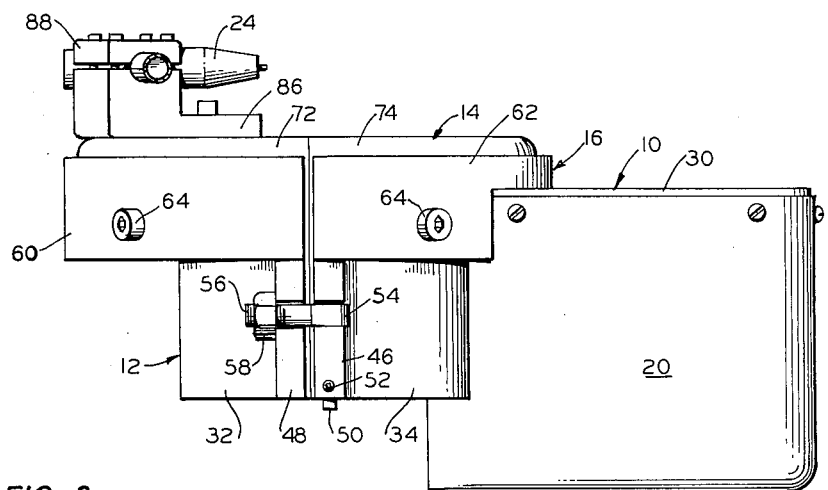
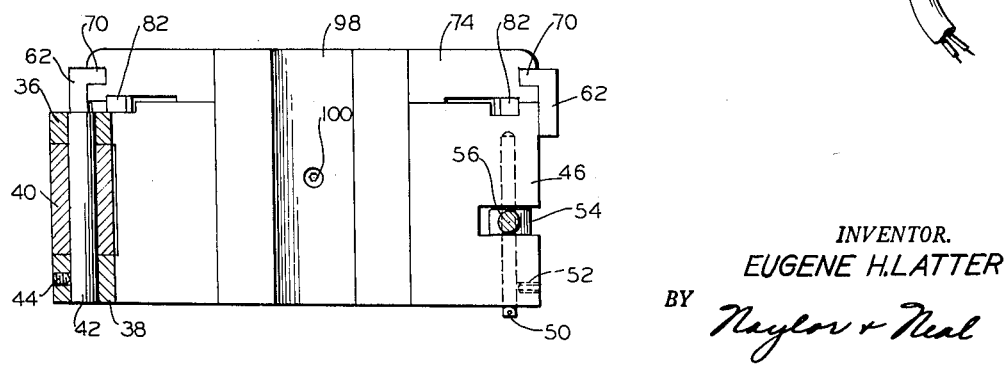

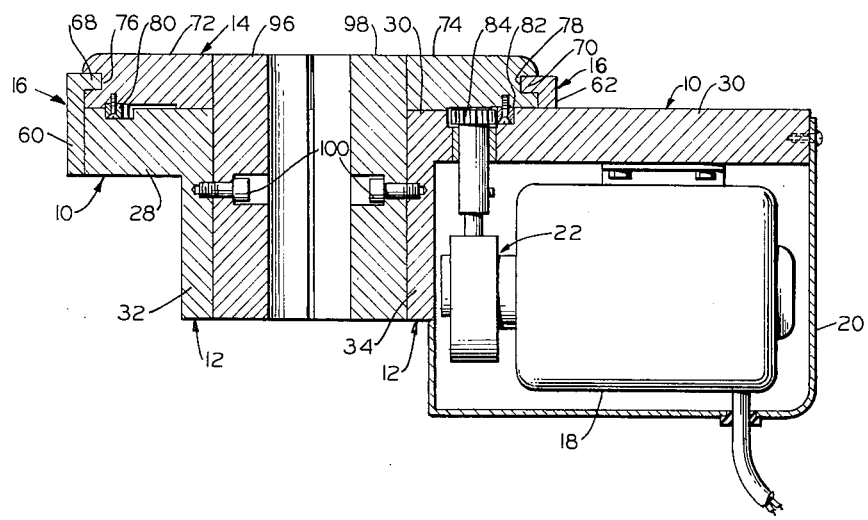
FIG_4
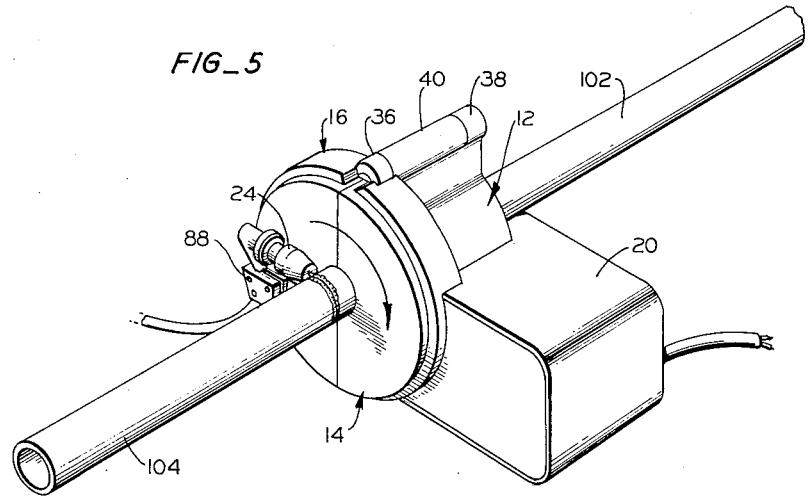
FIG_5
INVENTOR.
EUGENE H. LATTER
BY Naylor & Neal
ATTORNEYS

United States Patent Office 3,035,147
Patented May 15, 1962

This invention relates to welding equipment, and particularly to improvements in welding electrode holders and carriers of the type adapted to be removably mounted on the end of one pipe section so that another pipe section may be butt welded thereto.

An object of the invention is the provision of such a welding electrode holder and carrier which is compact, relatively light in weight, and therefore adapted for the butt welding together of relatively thin gauged and small diameter tubing.

A further object of the invention is the provision of such an electrode holder and carrier with 360° rotatable electrode carrier which is adapted, along with the balance of the holder and carrier assembly, to be readily separated into two sections along a hinge for placement and removal of the apparatus on a section of pipe.

Other objects and advantages of the invention will be apparent from the following description taken in conjunction with the drawing forming part of this specification, and in which:

FIGURE 1 is a top plan view of welding apparatus embodying the subject invention;

FIGURE 2 is a view in front elevation of the apparatus of FIGURE 1;

FIGURE 3 is a view in section taken along line 3—3 of FIGURE 1;

FIGURE 4 is a view in section taken along line 4—4 of FIGURE 1; and

FIGURE 5 is a view in perspective of the subject apparatus mounted on one pipe section and positioned for the welding to said section of another pipe section.

With reference to the drawing, the subject apparatus comprises a plate 10 (FIGURE 4), a hub 12 integral with said plate, a plate 14, a bearing ring 16 securing plate 14 to plate 10 for rotative movement relative to the latter, an electric motor 18 mounted on plate 10, an enclosure 20 for the motor, drive means 22 interconnecting the output shaft of motor 18 with plate 14, a welding electrode 24, and an electrode holder 26 connected to plate 14.

In greater detail, the mounting plate and hub elements 10 and 12 are divided, respectively, into plate parts 28 and 30 and hub parts 32 and 34 along a 180° parting, or hinge, line.

The plate and hub section 30, 34 is provided at one end of this hinge line with top and bottom hinge loops 36 and 38 and the plate and hub section 28, 32 is provided with an intermediate hinge loop 40, with said loops 36, 38 and 40 being connected together by means comprising a hinge pin 42 and a set screw 44 adapted to hold the hinge pin in place. Means to lock the two plate and hub sections together comprise wing members 46 and 48 which are integral, respectively, with plate and hub section 30, 34 and plate and hub section 28, 32. Wing member 46 is bored and slotted to accommodate a pivot pin 50, held in place by a set screw 52, and the loop end 54 of a swing bolt 56. Wing member 48 is slotted so that the bolt 56 may be swung into and out of locking relation with wing member 48, said locking relation being effected by an adjustable nut 58 carried by the swing bolt.

Guide, or bearing, ring 16 is formed of two essentially 180° sections 60 and 62 which are secured, respectively, to mounting plate sections 28 and 30 by set bolts 64.

The hinge ends of ring sections 60 and 62 are spaced apart and tapered, as indicated at 66, so as not to inhibit the swinging open of the two sections of the electrode holder and carrier to the degree desired. Ring sections 60 and 62 are provided with inwardly directed flanges 68 and 70.

Plate 14 is likewise comprised of two 180° sections indicated by 72 and 74. Plate sections 72 and 74 are provided with peripheral slots 76 and 78 into which the flanges 68 and 70 of guide ring sections 60 and 62 fit. This flange to slot connection is a bearing connection permitting rotation of plate 14 relative to plate 10 and hub 12.

Secured to the underside of the 180° plate sections 72 and 74 are 180° ring gear segments 80 and 82. One or the other of these gear segments 80 and 82 is always in mesh with a spur gear 84 which is driven in rotation by the motor 18 through the drive means 22. As shown in FIGURE 4, the plates 10 and 14 are suitably bored, counterbored and slot-relieved to accommodate the spur gear and gear segments in mesh relation.

The motor 18, as shown in FIGURE 4, is attached to section 30 of the mounting plate 10, being enclosed by casing 20 which is secured to said plate. The motor, which may be of the reversible type, is provided with control means, not shown.

The mounting means 26 for the electrode 24 comprises a bracket 86 and a mating clamp 88 removably secured thereto. Means for adjustably positioning the electrode 24 radially of section 72 of plate 14 comprise a slot 90 formed in the bracket, a set bolt 92, and a plurality of spaced capped holes, not shown, in plate section 72 to selectively receive the set bolts 92, said bolt holes being disposed along a line which is in parallel relation with the longitudinal axis of the head of the electrode 24. The tail piece 94 of the electrode is disposed at an acute angle with respect to the working end of the electrode head. This tends to prevent kinking of the power cable which is connected to the tail piece 94 as the plate 14 is rotated to move the electrode full around a pipe.

Adaptor sleeves consisting of two 180° semi-cylindrical sections 96 and 98 may be disposed within the common pipe-receiving bore extending through hub 12, plate 10 and plate 14 to adapt this bore to pipe of varying diameter. As shown in FIGURE 4, these adaptor members 96 and 98 may be secured to the hub 12 by set bolts 100 extending through the inserts into hub 12.

The electrode carrier and holder is employed in the manner illustrated in FIGURE 5. When the dividing line between two 180° sections 72 and 74 of plate 14 is aligned with the parting line between the sections of plate 10 and hub 12, the carrier may be opened, as illustrated in dotted outline in FIGURE 1, by unlocking the swing bolt 56. The carrier is then placed upon a pipe section, such as 102 of FIGURE 5, and brought into closed and locked relation with respect thereto. Depending upon the diameter of the pipe section 102, adaptor inserts such as 96 and 98 may be employed. The locking of the swing bolt secures the plate 10 and hub 12, or the adaptor inserts if they are used, to the pipe section 102 against movement relative to this pipe section. The pipe section 102, which is already installed in place, may extend in any direction.

The operation to be performed is the butt welding of pipe section 104 to section 102. Before locking, the plate of the carrier on section 102, section 104 is temporarily secured to section 102, as by tack welding. After this is done and after the carrier has been accurately positioned, the motor 18 is energized, as is the electrode 24, and the latter is caused to rotate fully around the pipe section joint. Once the butt weld has been completed, the unit may be repositioned at the free end of pipe section 104 so that another pipe section may be butt welded thereto.

The subject electrode carrier and holder is compact, light in weight, may be readily placed in position and removed by one man, and enables the automatic butt welding of pipe sections even in relatively restricted areas from the standpoint of space for manipulation.

What is claimed is:

1. Welding electrode carrier and holder means adapted for automatic butt welding of pipe or tube sections comprising an annular member having hub and plate portions, said member being comprised of complementary semi-annular sections adapted to fit about, relatively tightly embrace, and to be removable from a pipe or tube, said semi-annular sections being pivotally connected together by hinge means, the axis of pivot of which is parallel to the longitudinal axis of said annular member and disposed outside of the periphery of said annular member whereby said semi-annular sections may be pivotally swung apart, releasable locking means operable to maintain said sections of said annular member in relatively tightly embracing relation with said pipe or tube, an annular plate composed of complemental semi-annular sections disposed at the side of the plate portion opposite the side thereof at which said hub portion is disposed, said plate being centrally apertured to embrace said pipe or tube but to be rotatable relative thereto, means releasably carried by said plate portion supporting said annular plate for rotation about its axis and about the longitudinal axis of said hub portion, a motor mounted on said plate portion at the side thereof opposite said annular plate and disposed in laterally offset relation with respect to said hub portion, and a drive train extending from said motor through said plate portion into driving engagement with said annular plate to rotate said plate, the axis of pivot of said hinge means being also disposed outside of the periphery of said annular plate whereby the sections of said plate may be pivotally swung apart about said pivot axis, and means forming a connection between said annular plate and said annular member operable upon swinging movement apart of the sections of the latter to swing the sections of said annular plate apart.

2. The apparatus of claim 1 including a welding electrode having a head with its longitudinal axis disposed normal to the axis of rotation of said annular plate and disposed on a line of intersection with respect to said axis of rotation, and mounting means for said electrode adjustably mounted on said plate for selective movement of said electrode head along said line of intersection toward and away from said axis of rotation.

3. The apparatus of claim 2, said electrode having a tail piece interconnecting said head with a flexible power cable, the axis of said tail piece defining with the longitudinal axis of said head, in the direction of the working end of said head, an acute angle.

4. Welding electrode carrier and holder means adapted for automatic butt welding of pipe or tube sections comprising an annular member having hub and plate portions, said member consisting of complementary semi-annular sections adapted to fit about, relatively tightly embrace, and to be removable from a pipe or tube, said semi-annular sections being pivotally connected together by hinge means, the axis of pivot of which is parallel to the longitudinal axis of said annular member and disposed outside of the periphery of said annular member whereby said semi-annular sections may be pivotally swung apart, releasable locking means operable to maintain said sections in relatively tightly embracing relation with said pipe or tube, an annular plate disposed at the side of said plate portion opposite the side thereof at which said hub portion is disposed, said plate being comprised of complementary semi-annular sections adapted to embrace said pipe or tube but to be rotatable relative thereto, means carried by said plate portion supporting said annular plate for rotation about its axis and about the longitudinal axis of said hub portion, and motive power means mounted on said plate portion and comprising a driving connection with said annular plate, said annular plate being so related to said plate portion by said support means and by said driving connection as to prevent the swinging apart of said sections of said annular member about said pivot axis except when the line of division between the semi-annular sections of said annular plate is in registry with the line of division between said sections of said annular member and as to enable swinging apart movement of the sections of said plate in response to swinging apart movement of the sections of said annular member.

5. The apparatus of claim 4, said motive power means comprising a motor mounted on said plate portion at the side thereof opposite the side at which said annular plate is disposed, said driving connection comprising a shaft extending through said plate portion and terminating in a spur gear, and a ring gear composed of a pair of separate but complementary 180° segments, said segments being secured to said sections of said annular plate.

6. The apparatus of claim 5 including a welding electrode having a head with its longitudinal axis disposed normal to the axis of rotation of said annular plate and disposed on a line of intersection with respect to said axis of rotation, mounting means on said plate for selective movement of said electrode head along said line of intersection toward and away from said axis of rotation.

7. The apparatus of claim 6, said electrode having a tail piece interconnecting said head with a flexible power cable, the axis of said tail piece defining with the longitudinal axis of said head, in the direction of the working end of said head, an acute angle.

References Cited in the file of this patent

UNITED STATES PATENTS

| | | |
|---|---|---|
| 2,013,630 | Goldsborough | Sept. 3, 1935 |
| 2,459,047 | Scharf | Jan. 11, 1949 |
| 2,892,071 | Kitrell | June 23, 1959 |
| 2,894,111 | McNutt | July 7, 1959 |
| 2,906,851 | Kitrell | Sept. 29, 1959 |
| 2,914,653 | Ernst | Nov. 24, 1959 |
| 2,956,147 | Baker | Oct. 11, 1960 |